INVENTORS
CLIFFORD A. LANGLOIS
RUPPERT A. SANBORN
DAVID N. KOBERNUSS

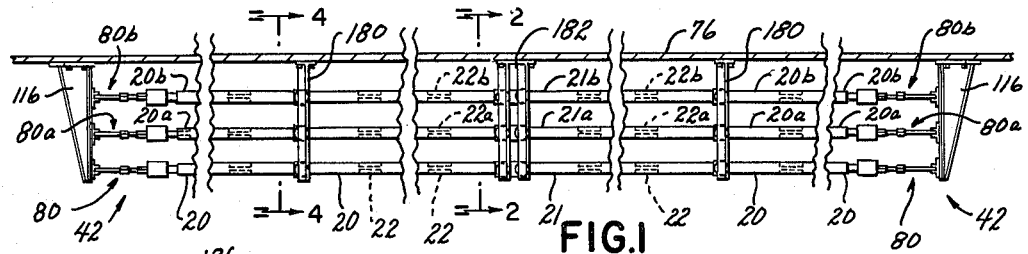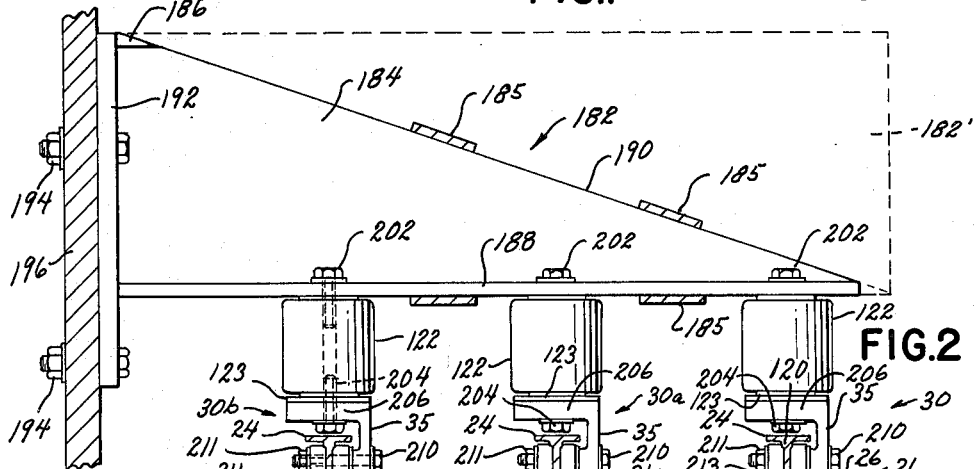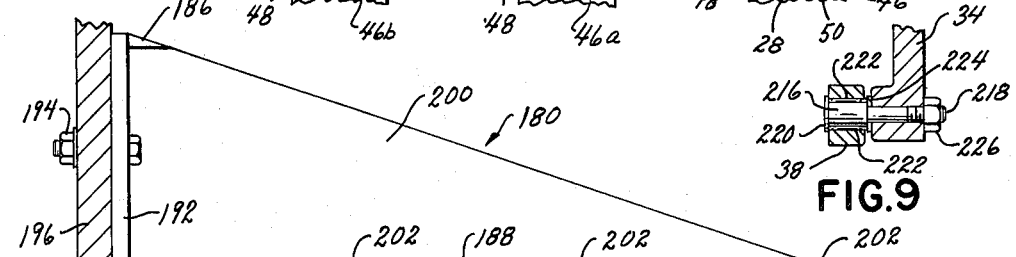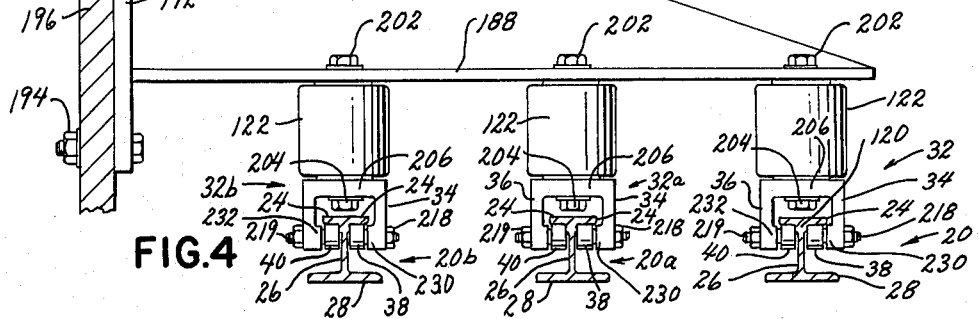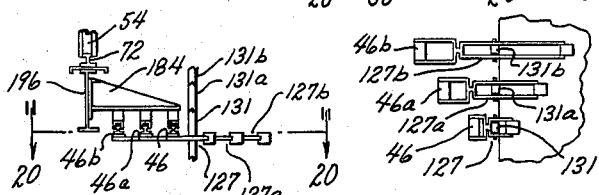

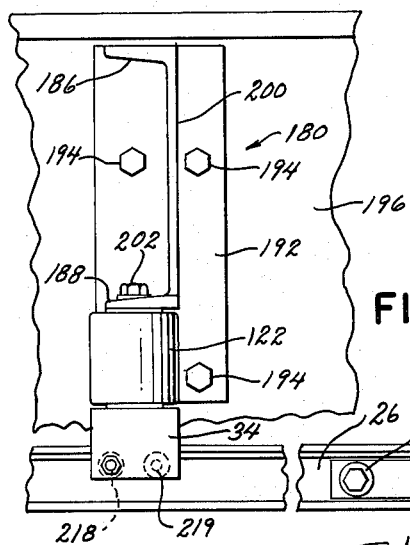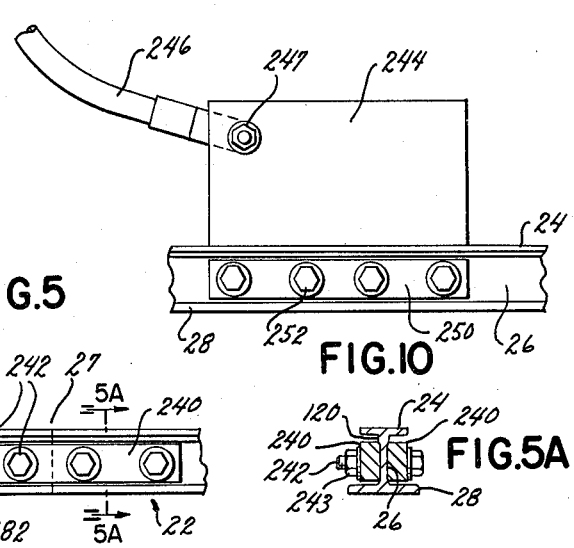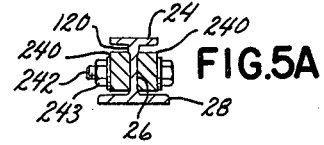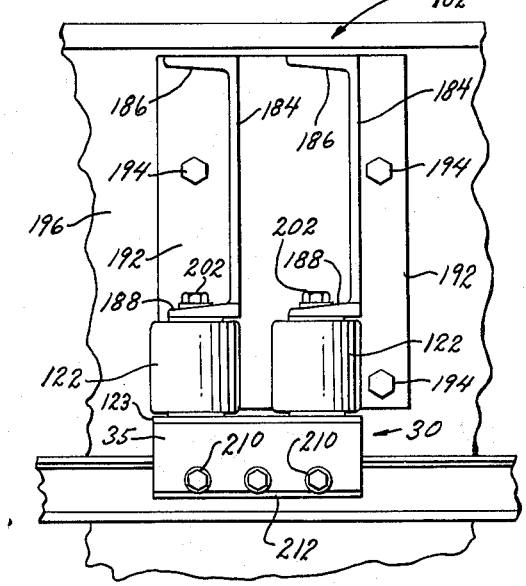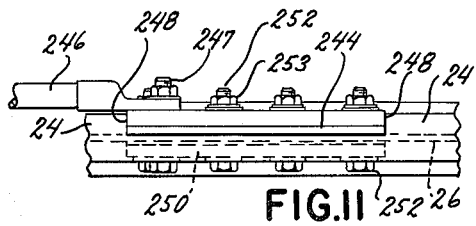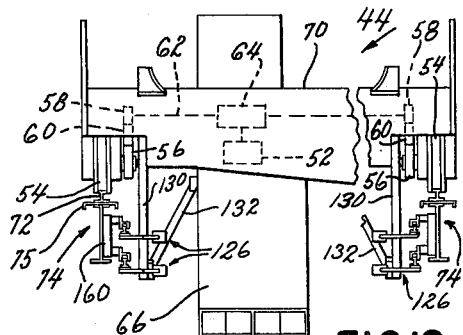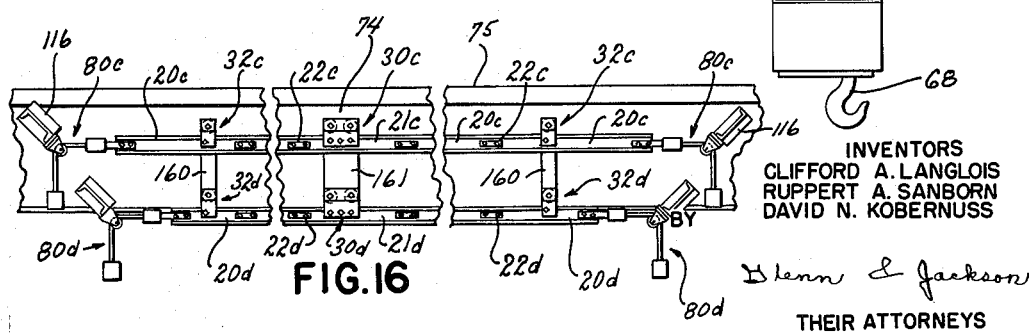

THEIR ATTORNEYS

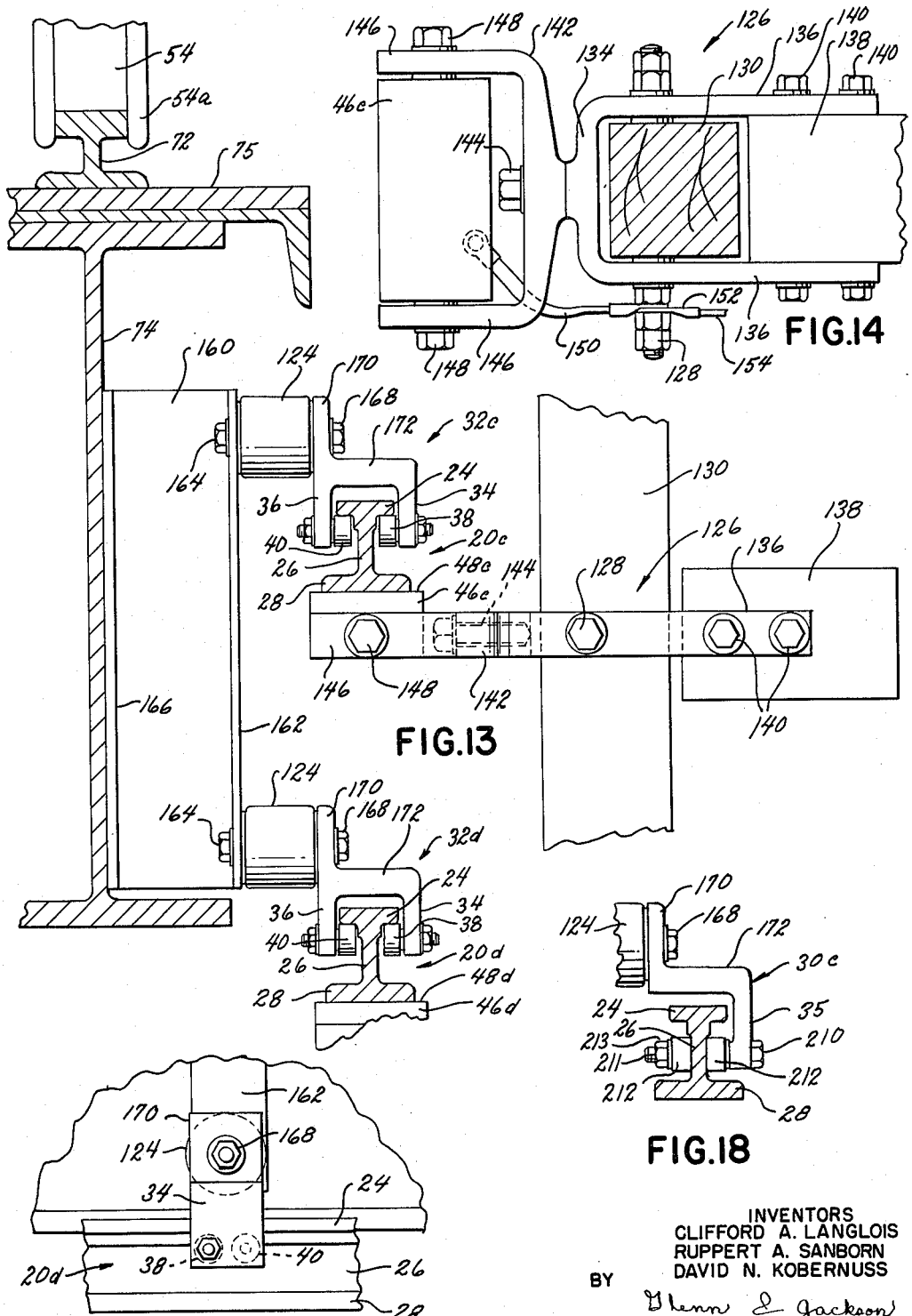

United States Patent Office
3,207,858
Patented Sept. 21, 1965

3,207,858
ALUMINUM CRANE COLLECTOR SYSTEM
Clifford A. Langlois, Chesterfield County, and Rupert A. Sanborn, Henrico County, Va., and David N. Kobernuss, Cook County, Ill., assignors to Reynolds Metals Company, Richmond, Va., a corporation of Delaware
Filed Jan. 26, 1960, Ser. No. 4,778
3 Claims. (Cl. 191—33)

This invention relates to an aluminum crane collector rail system and the like in which a large proportion of the construction parts may be made from aluminum extrusions which may be economically cut and drilled to produce the desired components.

Crane constructions and similar constructions in many industries are subject to adverse atmospheric conditions. They are likely to be located where fumes attack the materials used in their construction and where dust is likely to settle and adversely affect the contact parts.

According to this invention, the main parts which conduct the current, or are subject to the electrical potential of the current, are made of aluminum in extruded, cut and drilled form. The shapes of these parts are such that dust can not settle and adversely affect the travelling contacts of the system. The aluminum or aluminum alloy used is not generally affected by any fumes or vapors which are present in the atmosphere where such crane constructions are located. The aluminum or aluminum alloy parts used in such construction are relatively very light in weight. They are also relatively strong and effectively resist bending or flexing forces not only because of the strength of the material, but also because of the shapes which they are given.

The conductor sections which span between spaced supports have relatively deep vertical webs to resist adverse flexure between the supports. They are placed under longitudinal tension also to reduce such flexure. The tension members utilize gravitational pull to produce the tension on the conductor sections. The electrical contact members contact a flat horizontal under surface of the conductor sections by an upward force which may also be produced by gravitational pull. Such gravitational forces remain constant and are not adversely affected by temperature or corrosion as are springs or the like. The flat, horizontal under surfaces of the electrical conductors remain free of dust in dust laden atmospheres. The flat horizontal under surfaces also permit a substantial sidewise movement of the crane with respect to the conductor sections without the use of complicated multiple lever constructions.

The ampere capacity and the spanning strength of the electrical conductor sections may be varied to meet different requirements of installation without varying standard supporting brackets and other supporting structures. This variation is accomplished by changing the dimensions of the central vertical web and/or the lower horizontal flange of the conductor sections without changing the dimensions of the upper supporting flange so such upper supporting flange can accept the standard supporting brackets and other supporting structures which have been adopted by the seller or purchaser. Hence, inventory expenses are reduced for such supporting brackets and other supporting structures.

Hence, conductor sections are made of extruded aluminum in such a manner that sagging of the conductor between supports is relatively negligible.

Also, the contact surface between the stationary conductor surfaces and the contact member on the movable structure or crane permits a considerable sidewise movement of the crane without damage, in a very simple manner.

In addition, a longitudinal tension is placed on the conductor members by a weight construction which is not materially affected by the relatively large changes in temperature in the industrial building where such cranes structures are likely to be erected.

The conductor members are supported on brackets which have rollers on opposite sides of the conductors, which rollers have axes which are offset with respect to each other for ease in assembling or repair of such rollers.

The cross-sectional area, or conductivity, of the conductor sections may be readily varied without requiring change in the size or other specifications of the supporting structures.

Accordingly it is an object of this invention to provide a construction having one or more of the foregoing features.

Other objects are apparent from this description and/or the accompanying drawings, in which:

FIGURE 1 is a top diagrammatic plan view, with parts broken away, of a system embodying features of this invention.

FIGURE 2 is a transverse enlarged cross-section taken along line 2—2 of FIGURE 1, showing the median hanger.

FIGURE 3 is an elevation transverse to FIGURE 2.

FIGURE 4 is a transverse enlarged cross-section taken along line 4—4 of FIGURE 1, showing an intermediate hanger construction.

FIGURE 5 is an elevation transverse to FIGURE 4.

FIGURE 5A is a cross-section along line 5a—5a of FIGURE 5.

FIGURE 9 is an enlarged vertical cross-section of a typical roller construction such as shown in FIGURE 4.

FIGURE 10 is an elevation of a power supply member for a conductor.

FIGURE 11 is a top view of FIGURE 10.

FIGURE 12 is a diagrammatic view of a crane construction embodying features of this invention, with the central part broken away.

FIGURE 13 is an enlarged vertical view of a portion of FIGURE 12, partly in elevation and partly in cross-section.

FIGURE 14 is a top view of a portion of FIGURE 13, partly in cross-section.

FIGURE 15 is a transverse elevation of a portion of FIGURE 13.

FIGURE 16 is a diagrammatic elevation, with parts broken away, of another embodiment of a system embodying features of this invention which are shown in FIGURES 12–15 and 18.

FIGURE 18 is a cross-section of a median bracket of FIGURE 16.

FIGURE 19 is a diagrammatic view of the contactor structure for the embodiment of FIGURES 1–11.

FIGURE 20 is another view of the contactor structure of FIGURE 19.

Figure 17:
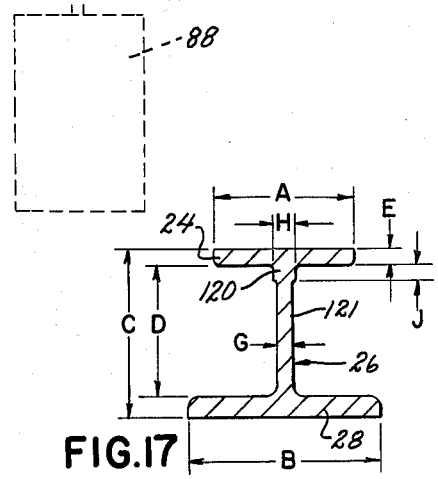
FIGURE 17 is a cross-section of a conductor section.

FIGURE 1 shows a system according to this invention in which a plurality of similar extruded aluminum electric conductor sections or bars 20 and 21 of I cross-section are in a longitudinally aligned relationship with their adjacent ends secured together by the connectors 22. The sections 21 are substantially similar in cross-section, as shown in FIGURES 2, 4 and 17, and have respectively a horizontal upper conductor flange 24, a vertical central conductor web 26, and a horizontal lower conductor flange 28.

An insulating supporting medial bracket 30, FIGURE 2, is fixedly secured to and fixedly holds the medial section 21, FIGURE 1, above its lower conductor flange 28. An insulating roller bearing supporting bracket 32, FIGURE 4, is longitudinally spaced from said medial bracket 30, as shown in FIGURE 1. The bracket 32 has vertical bracket flanges 34 and 36, FIGURE 4, which extend downwardly past the upper conductor flange 24 with rollers 38 and 40 supported by vertical bracket flanges 34 and 36 respectively and extending under and supporting said upper conductor flange 24.

Longitudinal tension means 42, FIGURE 1, are connected respectively to the endmost sections 20, to produce longitudinal tension in all of the sections 20 and 21.

A movable structure, such as a crane or the like, and such as diagrammatically illustrated in FIGURE 12 in connection with another embodiment, is guided and is movable in a direction substantially parallel to said conductor sections 20 and 21. Such a structure or crane 44, as diagrammatically shown in FIGURE 12, has an upwardly urged contact member 46 with a flat horizontal upwardly directed contact surface 48, FIGURE 2, slidably and changeably contacting the aligned lower surfaces 50 of said horizontal lower conductor flanges 28 of sections 20 and 21.

The movable structure, or crane 44, such as shown in FIGURE 12, has electric power means, such as the motor 52, which is electrically connected with the contact member 46, and similar contact members to be described, to be electrically energized from said conductor sections 20 and 21, and similar conductor sections to be described, through said contact member 46, FIGURES 2, 19 and 20, and similar contact members to be described. The power means or motor 52 may be used for any desired purpose, such as to rotate the supporting wheels 54 of the crane 44, which wheels may be energized from the motor 52 by any suitable transmission, such as by sprocket wheels 56 and 58, chain belts 60, shafting 62, and clutch and variable transmission means 64, which may be governed by the operator in the cab 66. This power means 52, or other power means, not shown, may operate the lifting crane member or members 68 in a well known manner.

The wheels 54, of FIGURE 12, at opposite ends of the crane beam or girder 70 may support and/or guide the crane 44 by means of the rails or tracks 72, which may be supported on inverted channels 75 and I beam structures 74, which are supported on suitable columns within the building at proper intervals. The rails 72 may be substantially parallel to the sections 20 and 21, and other sections to be described, so that the structure or crane 44 travels substantially in a direction parallel to such sections.

In FIGURE 1, the supporting or guiding means for the crane is the central web 76 of an I beam 74 of FIGURE 12. The web 76 of FIGURE 1 is diagrammatically indicated in cross section as the vertical web 76, which may be part of the beam 74 and directly connected with the crane supporting and guiding rail 72.

Figure 6:
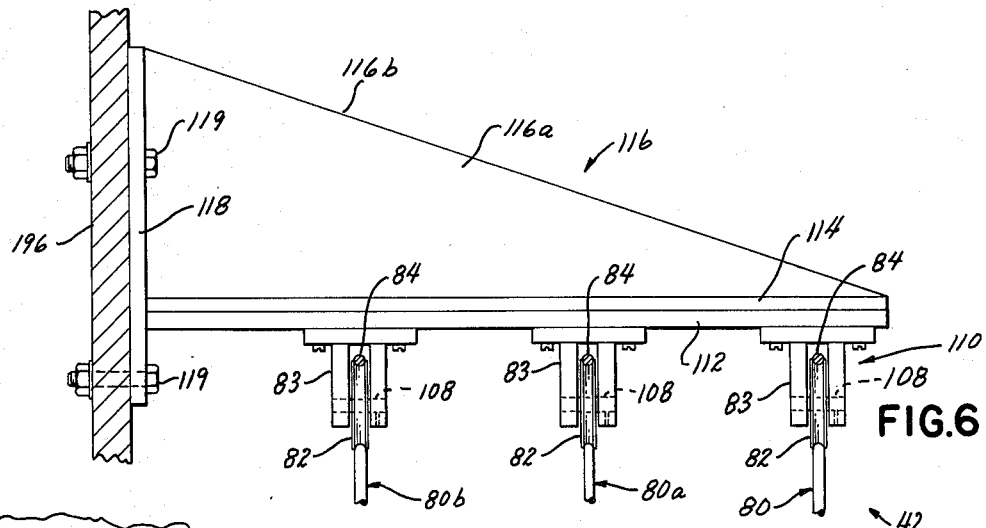
FIGURE 6 is an enlarged cross-sectional view taken along line 6—6 of FIGURE 7, showing the end tensioning means.
Figure 7:
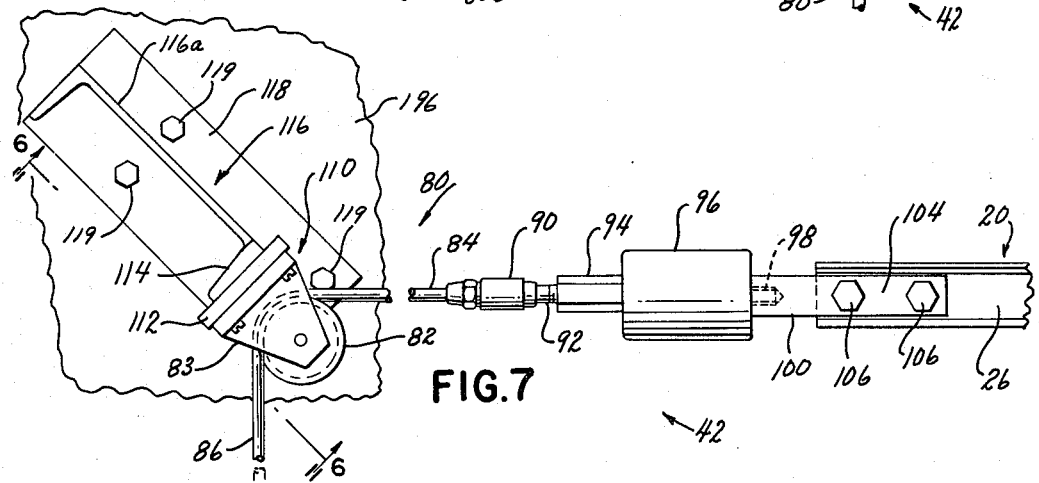
FIGURE 7 is an elevation transverse to FIGURE 6.
Figure 8:
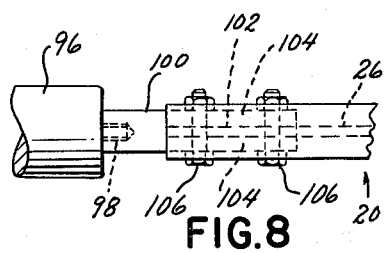
FIGURE 8 is a top view of a portion of FIGURE 7.

The longitudinal tension means 42 of FIGURE 1 may be of a character shown in more detail in FIGURES 6, 7 and 8. Such tension means may include cables 80, FIGURE 1, connected to the endmost sections 20 at each end of FIGURE 1. The cables 80 may respectively pass over pulleys 82, FIGURES 6 and 7, which pulleys are aligned with the endmost sections 20. Each cable 80 may have a substantially horizontal portion 84, connected with the nearest section 20, and with a substantially vertical portion 86 of the cable 80, which has a weight 88 secured thereto for exerting a gravitational pull on all of the sections 20 and 21 heretofore described.

In the embodiment herein specifically disclosed, each cable 80 may be a wire rope of plow steel substantially 5/16″ in diameter and of sufficient length for the installation, such as 6′ long. A suitable stud end fitting 90 is attached to the end 84 of the cable or rope 80, which fitting 90 has a threaded member 92, threaded to engage the connector 94 which is firmly embedded in the insulator 96. The insulator 96 may have a threaded member 98 extending therefrom at its other end, to which the connector 100 may be threadedly engaged. The connector 100 may be rectangular in cross-section if desired. The other end of the connector 100, which may be solid beyond the threaded portion 98, is slotted at 102, FIGURE 8, to straddle the vertical web 26 of the section 20, to which web 26 the ends 104 of the member 100 may be bolted at 106.

The pulley 82 may be supported on a shaft 108 which passes into proper openings in flanges 83 of the bracket construction 110 which may be secured to plates 111 and 112 which plate 112 in turn is secured to the lower flange 114 of a hanger 116. The hanger 116 has an end flange 118 which may be bolted to any supporting stationary rigid member or web 196 which may be a part of, or parallel to the guiding rail construction similar to 72 and 74 heretofore described in connection with FIGURE 12.

One end 86 of the cable 80 may be connected to the weight 88, which may be, for example, a lead weight of 200 pounds for this particular installation.

In FIGURES 4 and 17, the upper part 120 of the vertical central conductor web 26 may be made thicker than the lower portion 121 of the web 26 in all of the sections 20 and 21 as well as other sections elsewhere described. This permits the ends of the rollers 38 and 40 to hold the sections 20 and 21 against lateral movement. It also permits the lower part 121 of the web 26 to be made longer or deeper vertically without using too much material, and this extra vertical length or depth adds to the rigidity or resistance to the flexing of the section between supports.

A system comprising a plurality of combinations of aligned sections may be provided in which such combinations are spaced and parallel to each other. For example, such combinations may be horizontally spaced and parallel to each other, as shown in FIGURES 1 to 11. A second combination of sections may include sections 20a and 21a aligned and secured at the ends adjacent to each other at 22a. Tensioning means 80a, similar to tensioning means 80, may be provided for the endmost sections 20a. A third combination may include a plurality of sections 20b, and 21b, aligned and secured together by coupling means at the adjacent ends, such means being indicated by 22b. Also end tension means 80b similar to tension means 80, may be provided for the endmost sections 20b. All of the members of the second and third combinations are substantially identical with corresponding members of the first combination.

FIGURES 12–16 show a plurality of similarly aligned sections 20c and 21c parallel to sections 20d and 21d, which may be aligned in vertically spaced and parallel relationship, but may be otherwise same as in FIGURES 1–11. FIGURE 16 shows diagrammatically sections 20c which are aligned with a median section 21c and having their adjacent ends secured together at 22c. In FIGURE 16 these sections are shown in side elevation, instead of top elevation as in FIGURE 1. The endmost sections 20c are tensioned by weight tensioning means 80c which are substantially identical with the tensioning means 80 previously described. A second combination of aligned sections in vertically spaced and parallel relationship to each other includes the roller supported sections 20d and the median rigidly secured section 21d. These sections 20d and 21d have their aligned ends held by securing means 22d and are tensioned by tensioning means 80d all substantially in the same relationship as described in connection with FIGURE 1, except that these latter combinations of aligned sections are vertically spaced and parallel to each other. FIGURE 16 is also showing the inverted channel 75 and the beam 74 of FIGURE 12 in elevation. Other details are elsewhere described.

In FIGURE 2, the sections 21a and 21b are substantially identical with section 21 which has been previously described. The brackets 30a and 30b are substantially identical with the bracket 30 which has been previously described. The upwardly urged contact members 46a and 46b may have upper surfaces 48 identical with surface 48 of contact member 46 and may contact the lower surfaces of the flanges of sections 21a and 21b substantially identical without further repetition. In the embodiment of these FIGURES 12 to 16, the sections 20c, 20d, 21c, and 21d all have a horizontal upper conductor flange 24, a vertical central conductor web 26, and a horizontal lower conductor flange 28 such as shown in FIGURE 17. The upwardly urged contact members 46c and 46d, FIGURE 13, have upper horizontal flat surfaces 48c and 48d respectively contacting the bottom surfaces of the flanges 28 in a manner substantially identical with that described in connection with sections 20 and 21. Brackets 32c and 32d have downward vertical bracket flanges 34 and 36 which support rollers 38 and 40 substantially identical with the construction shown for bracket 32 in FIGURE 4. However, whereas FIGURES 1 through 11 have insulators 122 with their axes in a vertical direction, FIGURES 12 to 16 have their insulators 124 with their axes in a horizontal direction. Further details of these insulating constructions and bracket constructions are elsewhere described.

All of the contact members 46 to 46d may be upwardly urged by a respective counterweighted hinged arm. For example, the contact members 46c and 46d may be upwardly urged by respective hinged arms or levers 126, FIGURE 13, which are fulcrumed at 128 by suitable bolt constructions which pass through the frangible or destructible wooden column 130. The column 130 is secured to the crane 44 and is held against undue vibration by the frangible or destructible brace construction 132, FIGURE 12, so that the two arms 126 which are carried by the frangible member 132, may cause the member 132 to break should anything accidently get in the way of the arms 126. (The lower arm 126 to support the contact member 46d has been omitted, as it is a repetition substantially in all details with that shown for the contact member 46c.)

As shown in FIGURE 14, the arm 126 is made up of a right hand U-shaped member 134, having arms 136 straddling the column 130 and being secured to the counter weight 138 by bolts 140. The U-shaped member 134 is secured to another U-shaped member 142 by bolt construction 144. The U-shaped construction 142 has arms 146 which hold the contact member 46c by means of a bolt 148. The contact member 46c has a cable 150 connected thereto, which has connections 152 with additional cable or cables 154 leading to one or more power devices such as motor 52 of FIGURE 12.

The construction 126 of FIGURES 13 and 14 is a relativley simple lever or arm construction without any additional complicated levers and the like. The horizontal flat surface 48c of the contact device 46c permits a limited sidewise relative movement between the crane construction 44 of FIGURE 12 with respect to the conductors sections 20c, 20d, 21c or 21d, since the horizontal flat surface 48c can move sidewise as well as longitudinally. Such a sidewise movement may be caused by irregularities in the track and is advantageous in providing uniform wear thereby avoiding the formation of grooves on the wearing surface of the contact members.

In FIGURE 13, the supporting wheel 54 has flanges 54a which guide the crane construction in a path parallel to the lower contact surface of the lower flanges 28. Similar relationship exists between the crane construction of FIGURES 1–11.

The I beam 74 may have attached thereto intermediate roller supporting hangers 160, which may be vertical channel shaped members having flanges 162 to which the attaching bolts 164 of the insulators 124 are secured. The other flange 166 may be bolted or welded to the central web of the I beam 74. The other ends on the insulators 124 may have bolts 168 which are insulated in the body 124 from the bolts 164. The bolts 168 are secured to a vertical arm 170 of the bracket 32c or 32d. The bracket 32c also includes a horizontal bridge 172 to which the vertical bracket flanges 34 and 36 are secured. Other features of brackets 32c and 32d may be substantially identical with brackets 32, 32b and 32c, including the rollers 38 and 40, etc., the description of which need not be repeated.

FIGURE 16 shows a median hanger 161 which may be similar to intermediate roller supporting hangers 160 except the hanger 161 may be wider and may support, side by side, insulators, etc. which support brackets 30c and 30d, which may be similar in construction to brackets 32c and 32d except that they may be fixedly secured to the sections 21c and 21d in a manner similar to that shown in FIGURES 2 and 3.

All of the features with respect to the embodiment shown in FIGURES 12 to 16, which are consistent, are identical or substantially identical with similar corresponding devices in the embodiments of FIGURES 1 to 11, and vice versa, except where the differences are inconsistent with substantial identity because of the horizontal spacing in FIGURES 1–11 and the vertical spacing in FIGURES 12–16, as shown in the drawings or structions 116, 180, and 182.

In FIGURES 1 to 11 the three parallel combinations are supported by substantially horizontal hanger constructions 116, 180, and 182.

FIGURE 2 shows the hanger construction 182 in elevation. This may include two substantially vertical triangular webs 184 having horizontal flanges 186 and 188. In manufacture, a substantially rectangular shaped channel member, may be diagonally cut along the line 190, so that another substantially identical, but inverted hanger 182′, which is shown in dotted lines in FIGURE 2, is simultaneously made and may be used as a hanger where desired. The large (left side in FIGURE 2) ends of the webs 184 may be welded into a plate 192 and this plate may in turn be bolted at 194 to any structural member 196, which may be vertical web of an I beam corresponding to the vertical web of the I beam 74 of FIGURES 12–16, or any other structural member of the building which will be substantially parallel to the contact surface of sections 20–20c and 21–21c.

The triangular flanges 184 of the hanger 182 may be made more rigid by having plates 185 secured thereto by welding and the like to make a rigid double web construction.

The contact members 46, 46a, and 46b of the embodiment of FIGURES 1–11 may also be supported by counterweighted levels 127, 127a and 127b, FIGURES 19 and 20, which may be similar in construction to the counter-weighted lever 126 of FIGURES 13 and 14. All of the details of levers 127–127b may be substantially similar to the details of lever 126, and hence such details are not further described.

The levers 127–127b may be fulcrumed on frangible or destructible wooden columns 131, 131a, and 131b which may be substantially similar to column 130 of FIGURES 12–14 and be carried by the crane construction in a manner substantially similar to that described in connection with column 130 of FIGURES 12–14. The levels 127–127b may vary in length for the purpose of properly reaching the conductor sections 20–20b and 21–21b as is obvious.

A plurality of hangers 180 may be produced as shown in FIGURES 4 and 5. A triangular web 200, may be made substantially the same as or identical to the web 184 of FIGURES 2 and 3 and hence its construction is not further described. It also has flanges 186 and 188 substantially identical with those in FIGURES 2 and 3. The vertical insulators 122 of FIGURES 2–5 have their upper bolt constructions 202 secured to flange 188, while their lower bolt constructions 204, which are insulated from the upper bolt constructions 202 by the bodies 122, are secured to the horizontal bridges 206 of the brackets 30–30c and 32–32c. The bridges 206 of the brackets 32–32b of FIGURE 4 are connected to carry the vertical bracket flanges 34 and 36. The bridges 206 of FIGURE 2 carry the single vertical bracket flange 35 of brackets 30a and 30b. The brackets 32–32b may be made from a continuous extrusion having the shape of the bracket. Such extrusion may be cut to length as shown in FIGURE 5 and drilled where necessary to provide the bracket constructions. In brackets 30–30b of FIGURE 2, the flange which would have corresponded to the flange 36 of FIGURE 4 is cut away to leave the single flange 35 of the brackets 30–30b, which otherwise are the same as brackets 32–32b.

In FIGURES 2 and 3, the brackets 30–30b may be fixedly secured to the median sections 21–21b respectively by the desired number of bolts 210, such as three, which pass through the vertical web 26 of the sections 21–21b. The bolts 210 pass completely through the vertical web 26 and extend to the other side of the web where the nuts 211 secure the bolts in place. In addition, clamping plates or bars 212 surround the bolts 210 and lightly clamp the vertical webs 26 of the sections 21–21b. Lock washers 213 may be added, if desired, firmly to hold the median sections 21–21b anchored in the median position. The clamping plates or bars 212 may be substantially as long as the width of the flanges 35 of brackets 30–30b as shown in FIGURES 2 and 3. The clamping constructions of the brackets 30c of FIGURE 18 and identical bracket 30d have plate constructions 212 and flanges 35 substantially identical to corresponding constructions of brackets 30–30b, the only difference being in the supporting portions 170 and 172.

The roller constructions 38 and 40 for the brackets 32–32c, and 32d, may be of a character shown in FIGURE 9. For example, the roller 38 may be mounted on the thicker portion 216, of the bolt 218. The bolt 218 may have a flat head 220 to hold the roller 38 from axial movement. Roller bearings 222, of needle diameter, may be placed between the roller 38 and the thicker portion 216. A spacing washer 224 may be placed between the thicker portion 216 and the vertical bracket flange 34. The thicker portion 216 is slightly longer than the width of the roller 38 to prevent any binding of the roller 38, regardless of the tightness with which the nut 226 may be drawn. The nut 226 may be self locking, or a lock washer, not shown, may be provided. The roller 40 may have a similar construction.

The rollers 38 and 40 have respective axes established by the bolts 218 and 219, which are otherwise identical. These bolts 218 and 219 may be substantially of the length of the spacing of the thicker portions 230 and 232 of the supporting flanges 34 and 36. When a conductor section 22 is removed, or before it is inserted in the bracket, the roller constructions 38 and 40 and the bolts carrying them are longitudinally offset with respect to each other as shown in FIGURE 5, so that the bolts 218 and 219 can be moved for insertion or removal from the bracket without interference from the other bolt. That is, the bolt 218 can be moved or removed by moving the head 220 against the inside of the thick portion 232, FIGURE 4, with sufficient clearance to insert or remove the bolt. Likewise the bolt 219 may be inserted or remove because it is not interfered with by the bolt 218 because of the offset relationship in side elevation, as shown in FIGURE 5.

Securing pieces 240, FIGURES 5 and 5A, are of a size and shape to fit snugly against the thinner parts of the vertical webs 26 and if desired against the thicker portion 120 and the flange 26. Members 240 are placed on both sides of the vertical web 26 adjacent to the abutting ends 27 of adjacent sections to form the connections 22. The bolts 242 are then placed in suitable openings in the members 240 and the webs 26 firmly to secure the ends of the sections together. The bolts 242 pass completely through all of the members and suitable nut constructions 243 are provided to complete the clamping action.

Power connectors may be provided for all of the conductor constructions disclosed herein. For example, as shown in FIGURES 10 and 11, a power supply plate 244 has a power line 246 secured thereto by bolt 247. A suitable notch 248 is formed in the upper flange 24 of the selected conductor section 20 or 21. A member 250, substantially the same as member 240, is placed on the other side of the conductor, and suitable bolts passed through the member 250, the vertical flange 26 and the plate 244 and are secured by nuts 253.

The hanger 116 may have a triangular web 116a which is substantially the same in general construction as the webs 184 and 200 heretofore described. The web 116a may also be made by sawing a rectangular piece at the diagonal lines. The flange or plate 118 may be welded to the member 116, similarly to the other hanger constructions, and the plate 118 may then be bolted by bolts 119 to the rigid member 196 heretofore described. The web 116 preferably is placed in slanting position as shown in FIGURE 7 to provide not only a vertical support, but a horizontal support of sufficient strength, as is obvious.

FIGURE 17 indicates various dimensions suitable for use with varying conductor lengths, varying ampere capacities and varying beam strengths. These conductors may be made of aluminum alloys, such as No. 6063-5T or 6T. Any particular user or seller may adopt standard dimensions A and E and may vary other dimensiosn, such as B, C, and D to obtain desired ampere capacities and beam strengths. The user may then have one set of standard brackets, etc., for such different conductors. For example:

A may be 1⅝ inches for 600–1000 amperes.
A may be 2 inches for 1000–3000 amperes, and dimension A may be maintaineid at either of the two sizes for any particular user.

$B = 2–3$ inches; $C = 1^{15}/_{16}'' – 3^{5}/_{8}''$; $D = 1^{1}/_{2}'' – 3''$; $E = ^{3}/_{16}''$; $F = ^{1}/_{4}'' – 1^{1}/_{16}''$; $G = ^{3}/_{16}'' – 1^{1}/_{16}''$.

Whenever the conductivity or the beam depth is to be changed, dimensions such as B, C and D may be varied without disturbing the dimensions A and E. Therefore, the brackets 22–22d and 30–30d and other supporting members need not be changed and are adapted to receive conducting sections 20–20d and 22–22d of varying beam strength and conductivity without change in supporting bracket size.

The above dimensions and alloy members are given to indicate a suitable example, and are not intended to limit the broad scope of the invention.

Systems, such as shown in FIGURES 1 and 16, may have varying lengths, ampere capacities, voltages, etc., depending on the particular installation the size of the building, size of crane, etc. In an installation such as in FIGURE 1, the supporting columns of the building may be spaced 24 feet apart, substantially all of the sections 20 may be 24 feet long (of which 51 such sections may be used in a typical installation) with the endmost sections 20 being of a size to fit in the particular building, such as 17½ feet in length. The median section 21 may be 22 feet in length. In the above typical installation the total length was over 1300 feet and ampere capacity may be 600 amperes, and the cross section dimensions indicated in FIGURE 17 may be:

$A=1\frac{5}{8}$ inches; $B=2\frac{1}{4}$ inches; $C=1\frac{15}{16}$ inches; $D=1\frac{1}{2}$ inches; $E=\frac{3}{16}$ inch; $F=\frac{1}{4}$ inch; $G=\frac{3}{16}$ inch.

Other supporting members may be of a size somewhat proportional to the relative sizes in the drawings.

In an installation, such as above described, there may be a conductor length of approximately 650 feet on each side of the median anchor 182 for a total of 1300 feet more or less. In some factory buildings the ambient temperature may vary in a range of as much as 140° F., or more, such as from −40° F. to 120° F. The endmost conductor sections 20 adjacent the tension members 80 may move longitudinally up to a maximum of about 1.5 feet on each end because the expansion of the 650 foot length of conductor, and the roller constructions 38 and 40 permit easy movement of the conductor sections 20 during such change in temperature. The weights 88 and 138 are unaffected by such change in temperature.

Many of the members may be cut from aluminum extrusions or aluminum plate of suitable strength, which may be made of aluminum alloy 6063-T6 or T5.

The parts 20–20d, 21–21d, 22–22d, 30–30d, and others, if desired, may be made of aluminum extrusions cut to the desired length.

The parts 244, 100, 123, 250, and others, if desired may be made of aluminum plate.

The brackets 180, 184 and 116 may be interchangeable and may be made of weldment steel. The pulley brackets 83 may also be made of weldment steel.

Spacer plates 123 of aluminum plate, if desired, may be placed between the insulators 122 and the brackets 30–30d.

Although the conductors have been described as being under tensions such as by the means shown most clearly in FIGURES 6 and 7, it is to be expressly understood that the use of tensioning means is optional and that it is possible for the conductors of the present invention to expand and contract satisfactorily without being under tension.

It is, therefore, to be seen that a new and useful aluminum crane construction system has been provided in which the construction is non-corrosive, light and strong and in which the current carrying capacity of the components may be varied without changing the dimensions of the supports and similar items.

While the form of this invention now preferred has been disclosed as required by statute, other forms may be used, all coming within the claims which follow.

What is claimed is:

1. In combination: a longitudinal electric conductor having a central vertical web and a supporting horizontal flange having sides extending outwardly on both sides of said web; an insulated supporting bracket having vertical flanges downwardly extending past said sides of said horizontal flange; a pair of rollers with one of said rollers secured on the inside of one of said vertical flanges and the other of said rollers secured on the inside of the other of said vertical flanges, said rollers extending under and supporting said sides of said horizontal flange, each of said rollers having a supporting bearing bolt with a bearing head for its respective roller inside its respective vertical flange and extending through its respective vertical flange with an attaching nut on the outside of its respective vertical flange, each bearing bolt being substantially of the length of the spacing of the portions of the vertical flanges where said bolts are attached, the axes of said bearing bolts being offset with respect to each other a distance greater than the radius of the rollers for insertion and removal of said bolts without interference from each other.

2. In combination: a plurality of substantially similar extruded aluminum I cross sectioned electric conductor sections in longitudinally aligned relationship, with their adjacent ends secured together, said sections having respectively a horizontal upper conductor flange, a vertical central conductor web and a horizontal lower conductor flange, the adjacent ends of said conductor sections being secured together by clamping plates on both sides of the central conductor web of said adjacent sections; an insulating supporting medial bracket construction fixedly secured to and fixedly holding a medial one of said sections above its lower conductor flange and between its ends; insulating roller bearing supporting brackets longitudinally spaced from said medial bracket and respectively with vertical bracket flanges extending downwardly past a respective upper conductor flange and with rollers supported by said vertical bracket flanges and extending under and supporting said last named respective upper conductor flange; longitudinal tension means connected respectively to the endmost of said sections to produce longitudinal tension in said sections; a movable structure guided and movable in a direction substantially parallel to said conductor sections, said structure having an upwardly urged contact member with a flat horizontal upwardly directed contact surface slidingly and changeably contacting the lower surfaces of said horizontal lower conductor flanges, in which the upper portion of said vertical central conductor web is thicker than the lower portion of said last named web and in which said rollers extend along the upper thicker portion of the web, and in which said medial bracket construction is fixedly secured to the lower portion of said last named web.

3. In combination: a plurality of substantially similar extruded aluminum I cross sectioned electric conductor sections in longitudinally aligned relationship, with their adjacent ends secured together, said sections having respectively a horizontal upper conductor flange, a vertical central conductor web and a horizontal lower conductor flange, the adjacent ends of said conductor sections being secured together by clamping plates on both sides of the central conductor web of said adjacent sections; an insulating supporting medial bracket construction fixedly secured to and fixedly holding a medial one of said sections above its lower conductor flange and between its ends; insulating roller bearing supporting brackets longitudinally spaced from said medial bracket and respectively with vertical bracket flanges extending downwardly past a respective upper conductor flange and with rollers supported by said vertical bracket flanges and extending under and supporting said last named respective upper conductor flange; longitudinal tension means connected respectively to the endmost of said sections to produce longitudinal tension in said sections; a movable structure guided and movable in a direction substantially parallel to said conductor sections, said structure having an upwardly urged contact member with a flat horizontal upwardly directed contact surface slidingly and changeably contacting the lower surfaces of said horizontal lower conductor flanges, in which said contact member is carried by said structure by means of a support which is relatively harmlessly fracturable when said contact member is accidentally obstructed from movement.

References Cited by the Examiner

UNITED STATES PATENTS

| | | | |
|---|---|---|---|
| 346,990 | 8/86 | Finney | 191—23 |
| 350,666 | 10/86 | Davies | 238—243 |
| 450,164 | 4/91 | Lieb | 191—44 X |
| 505,741 | 9/93 | Wolf | 191—12 |
| 552,479 | 12/95 | Kendall. | |
| 941,390 | 11/09 | Stewart | 191—55 |
| 1,166,826 | 1/16 | Etheridge | 238—14.14 X |
| 1,531,075 | 3/25 | Clubine | 104—5 |
| 1,658,757 | 2/28 | Bernhoeft. | |
| 1,693,359 | 11/28 | Wichert | 174—88 X |
| 1,868,723 | 7/32 | Boyce | 191—42 X |

(Other references on following page)

UNITED STATES PATENTS

| | | | |
|---|---|---|---|
| 1,945,754 | 2/34 | Peebles | 104—196 |
| 2,254,147 | 8/41 | Horn | 191—23 |
| 2,257,027 | 9/41 | Thompson | 238—122 |
| 2,392,417 | 1/46 | Spafford et al. | 104—48 |
| 2,461,696 | 2/49 | Morningstar | 191—49 |
| 2,728,819 | 12/55 | Hauss | 191—23 |
| 2,989,579 | 6/61 | Somes | 174—99 |
| 3,090,840 | 5/63 | Dehn | 191—23 |

FOREIGN PATENTS

| | | |
|---|---|---|
| 1,008,012 | 2/52 | France. |
| 1,181,068 | 1/59 | France. |
| 8,926 | 6/84 | Great Britain. |
| 648,290 | 1/51 | Great Britain. |
| 951,832 | 11/52 | Germany. |

EUGENE G. BOTZ, *Primary Examiner.*

JAMES S. SHANK, LEO QUACKENBUSH, *Examiners.*